United States Patent [19]
Chien et al.

[11] 3,950,501
[45] Apr. 13, 1976

[54] PRODUCTION OF HIGH-PURITY CHLORINE FROM HYDROGEN CHLORIDE

[76] Inventors: Luther C. Chien, 625 McKinley Ave., Pitman, N.J. 08071; Jack K. Nyquist, Hillendale Road R.D. 1 Box 255, Avondale, Pa. 19311; Charles Yembrick, Jr., 19 Drummond Drive, Wilmington, Del. 19808

[22] Filed: Feb. 13, 1974

[21] Appl. No.: 442,170

[52] U.S. Cl. ................. 423/507; 423/502; 423/390
[51] Int. Cl.² .......................................... C01B 7/00
[58] Field of Search ............ 423/500, 507, 502, 388

[56] References Cited
UNITED STATES PATENTS

| | | | |
|---|---|---|---|
| 3,152,870 | 11/1964 | Baumgartner | 423/507 |
| 3,201,201 | 8/1965 | VanDijk | 423/502 |
| 3,449,079 | 6/1969 | Jongenburger | 423/654 |
| 3,451,776 | 6/1969 | VanDijk | 423/507 |
| 3,544,274 | 12/1970 | VanDijk | 423/502 |

OTHER PUBLICATIONS

Bretsznajder, et al,; "Otlenianie Nitrozy Tlenem Pod Cisieniem Wyzsym Od Atmosterycznego"; *Przemysl Chemiczny,* Vol. XII, pp. 674–678; (1956).

*Primary Examiner*—L. Dewayne Rutledge
*Assistant Examiner*—Michael L. Lewis

[57] ABSTRACT

An improvement in the continuous process for oxidizing hydrogen chloride to chlorine with an aqueous mixture of nitric and sulfuric acids, which acids are subsequently regenerated, the improvement concerned primarily with maintaining critical water control of from 23.0 to 27.5 percent, by weight, during the oxidation reaction to form the chlorine and from 27.5 to 30.0 percent during the reaction wherein the nitric and sulfuric acids are regenerated; and with maintaining the mol ratio of HCl to $HNO_3$ at about 2 to 1 during the oxidation reaction to form the chlorine.

1 Claim, 1 Drawing Figure

U.S. Patent April 13, 1976 3,950,501
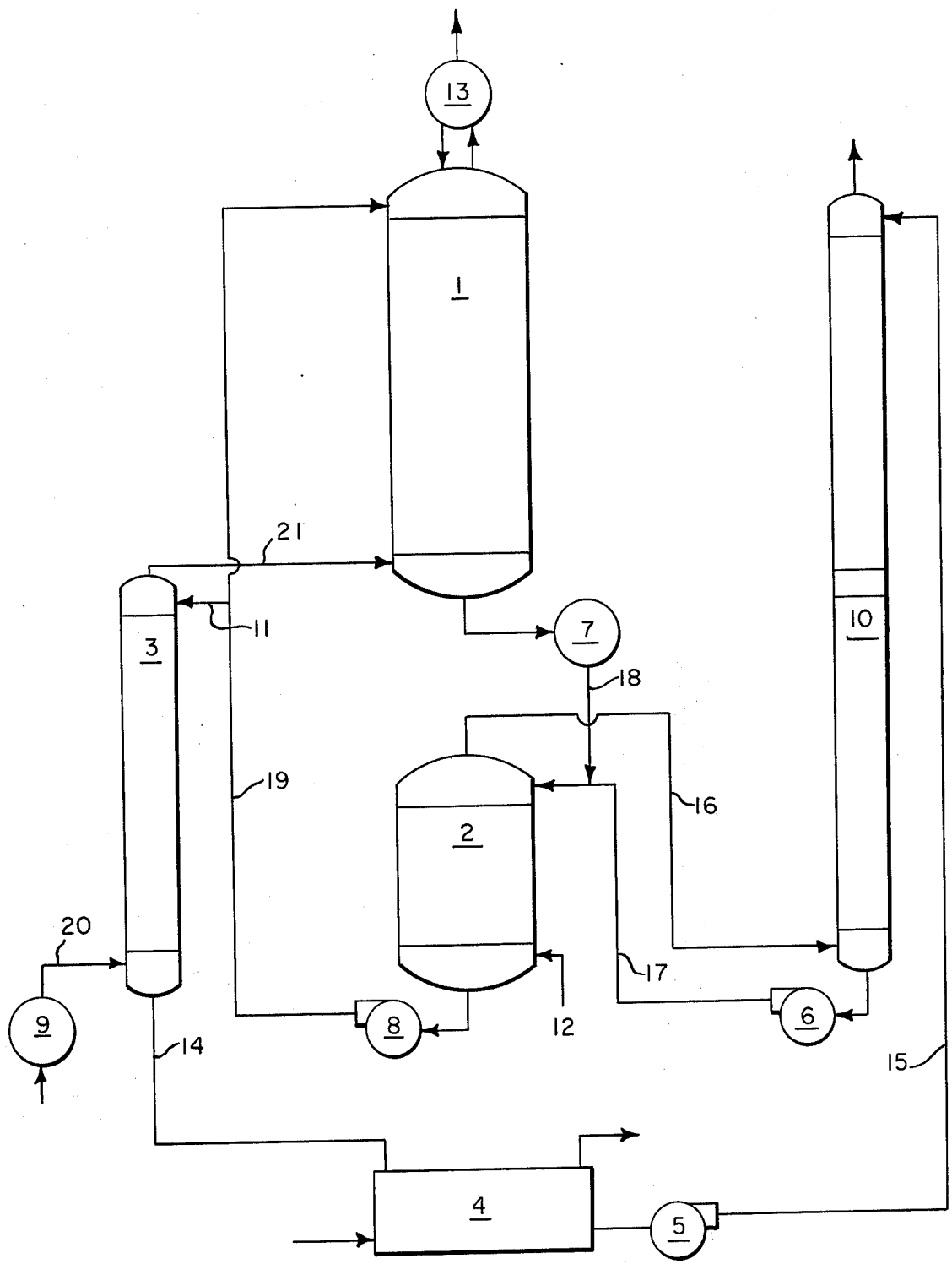

PRODUCTION OF HIGH-PURITY CHLORINE FROM HYDROGEN CHLORIDE

BACKGROUND OF THE INVENTION

1. Field of the Invention

This invention concerns a process for oxidizing HCl to high-purity $CL_2$ in a high conversion with an aqueous nitric acid-sulfuric acid mixture.

2. Description of the Prior Art

The Deacon process for oxidizing HCL to $CL_2$ with oxygen utilizing a copper compound catalyst is old. Over the years, numerous processes for accomplishing this reaction have been developed, including some wherein the oxidizing agent is nitric acid. Among these processes is the one disclosed by Baumgartner, et al., in U.S. Pat. No. 3,152,870, and that disclosed by Jongenburger, et al., in U.S. Pat. No. 3,449,079.

The Baumgartner process is carried out by passing HCL gas countercurrently into contact with an oxidizing mixture containing 10 to 40% nitric acid, 45 to 90% sulfuric acid and as little as 5% water. The amount of water present during the subsequent regeneration is about 50 percent. The mol ratio HCL to $HNO_3$ is about 1.0 or lower. The product gas contains about 60% chlorine and 40% nitrogen peroxide by weight. The process does not produce high-purity chlorine since the product is contaminated by about 40% nitrogen peroxide.

In Jongenburger's process, HCL is contacted with a nitric acid mixture containing at least 80% sulfuric acid, and the sulfuric acid concentration may not vary by more than 8 percent during oxidation. The amount of water present during the oxidation reaction is about 18 to 20 percent. The amount of water present during the subsequent regeneration step is about 19 percent or less. Subsequent to the oxidation, sulfuric acid containing nitrosyl sulfuric acid as spent oxidant is contacted with a mixture of air and steam to convert the nitrogen-containing species to NO and $NO_2$. Further oxidation with air or oxygen converts nearly all of the mixture to $NO_2$, which is converted mainly to nitric acid. The product of this process is a mixture of chlorine and HCL containing only about 77% $CL_2$. The process does not produce high-purity chlorine since the product is contaminated by about 23% HCL.

The background section of the Jongenburger patent points out various difficulties in prior art processes. Such difficulties are said to lie in the following facts: that the product contains an excessive amount of nitrogen dioxide, that a substantial amount of hydrogen chloride is entrained in the liquid sulfuric acid reaction medium, and that high dilution of the sulfuric acid requires expensive and complicated reconcentration. Actually, Jongenburger solves these problems to a degree, primarily by introducing a new problem, a high concentration of unreacted hydrogen chloride in the chlorine product.

It has now been found that the process of this invention gives complete oxidation of HCL, no excess amount of $NO_2$ in the chlorine product, and no excess amount of hydrogen chloride left in the sulfuric acid reaction medium. The adjustment of acid concentration is expeditiously accomplished by diverting about 5 to 10 percent of the circulating stream, stripping out nitrogen-containing species and any other volatiles, and concentrating the relatively small amount of acid to a relatively high strength.

SUMMARY OF THE INVENTION

This invention concerns an improvement in a continuous process for making chlorine, which process broadly comprises i. reacting hydrogen chloride with an aqueous oxidizing mixture of nitric and sulfuric acids thereby producing a chlorine-containing species, a nitrogen-containing species, spent sulfuric acid and water, and ii. reacting the nitrogen-containing species with oxygen and aqueous sulfuric acid reactants thereby regenerating an aqueous mixture of nitric and sulfuric acids, the improvement comprising, maintaining in (i) a critical water concentration from 23.0 to 27.5 percent, by weight of the oxidizing mixture, maintaining the mol ratio of hydrogen chloride to nitric acid at between 1.8–2.2 to 1, and concentrating up to about 10 percent of the spent sulfuric acid and returning this concentrated acid to the reaction, thereby maintaining the critical water concentration; and maintaining in (ii) a critical water ratio from 27.5 to 30.0 percent, by weight of the reactants, thereby producing chlorine of at least 95 percent purity in a conversion of at least 95 percent based on HCL.

The sulfuric acid product of the (up to) 10 percent concentration operation is sufficient in amount to purify the crude chlorine product from the HCL Oxidizer effectively. In addition, there is provided sufficient acid of high concentration, about 90 to 97 percent, to increase the concentration of the acid flowing from the bottom of Oxidizer 1 to the top of Oxidizer 2 as desired. This allows the reaction in Oxidizer 2 to be carried out at or near optimum conditions of about 27.0 percent water.

BRIEF DESCRIPTION OF THE DRAWING

The FIGURE is a flow diagram showing one typical method for carrying out the improved continuous process of this invention.

DETAILS OF THE INVENTION

The process can be carried out in any type of vessel having sufficient resistance to chemical corrosion and providing means for mixing the reactants efficiently. Preferred reaction temperatures for the HCL oxidation are between about 80°C. to 100°C. Pressures are between about 1 to 25 atmospheres. Preferred pressures are 10 to 15 atmospheres. The preferred nitric acid concentration is about 1.0 to 6.0 percent based on the weight of acid solution (nitric and sulfuric acid plus water).

Concerning the oxidation of the nitrogen-containing species which proceeds at a conversion of from 90 to 100 percent, the preferred reaction temperatures are about 80°C. to 140°C., and reaction pressures can be between about 1 to 25 atmospheres, preferably 10 to 15 atmospheres.

Surprisingly, it has been found that provision of an approximately 2 to 1 mol ratio of HCL to $HNO_3$, will tend to produce a reaction postulated as follows, although the exact mechanism is not known:

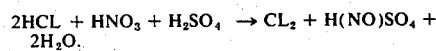

To the degree that this reaction is encouraged, the chlorine produced will be pure, uncontaminated by nitric oxide, nitrosyl chloride or unreacted hydrogen chloride. Also, the main reaction (ii) occurring where the nitrogen-containing species are oxidized to nitric acid will most likely be:

$$H(NO)SO_4 + 1/2O_2 + H_2O \rightarrow HNO_3 + H_2SO_4.$$

In contrast to prior art teachings, the present process uses oxygen or air to oxidize nitrosyl sulfuric acid producing a mixture of sulfuric and nitric acid without formation of and need for separation of nitric oxides from the reaction mixture.

While the only materials theoretically consumed in the process are oxygen and hydrogen chloride, it may be necessary to furnish small increments of sulfuric acid and nitric acid to replace slight material losses.

THE FIGURE

Referring now to the FIGURE, typical operation of the continuous process of the invention will be described. The basis for the quantities of materials involved is a feed rate of 100 moles of HCL gas per hour.

HCL gas is introduced through line 12 to HCL Oxidizer 1 at 100 moles per hour. Meanwhile, a sulfuric acid mixture is introduced at the top of Oxidizer 2, from line 18, the mixture furnishing, per hour, 455.6 moles of $H_2SO_4$, 3.9 moles of $H(NO)SO_4$, 49.99 moles of $HNO_3$ and 1008.9 moles of $H_2O$. The sulfuric mixture contacts and reacts with the entering HCL, oxidizing it to $CL_2$ and $H_2O$. Temperature in Oxidizer 2 is about 82°C. at the top and 90°C. at the bottom.

The gas issuing per hour from the top of Oxidizer 2 contains 49.49 moles of $CL_2$, 0.77 mol of NOCL and 0.50 mole of $NO_2$ plus smaller amounts of $NO_2CL$ and $H_2O$, or about 97–98 percent pure $CL_2$. It is sent via line 16 to the bottom of Finishing Tower 10. The sulfuric acid mixture exiting from the bottom of Oxidizer 2 per hour contains 407.12 moles of $H_2SO_4$, 52.37 moles of $H(NO)SO_4$ and 1107.94 moles of $H_2O$. Of this sulfuric acid mixture, 94.42 percent is sent via pump 8 to nitrosyl sulfuric acid Oxidizer 1 through line 19, while 5.88 percent is sent to nitrogen species Stripper 3 through line 11. This acid contains 60% $H_2SO_4$, 10 percent $H(NO)SO_4$ and 30% $H_2O$.

In Stripper 3 the downflowing acid contacts 26.11 moles per hour of upflowing $O_2$ which contains 0.13 moles of argon. The oxygen gas is introduced via Heat Exchanger 9 through line 20 leaving the Heat Exchanger at 140°C. The upflowing gas oxidizes nitrogen species such as nitrosyl sulfuric acid to volatile species which exit from the top of Stripper as gases. The gas stream contains, per hour, 25.38 moles of $O_2$, 0.13 mole of Ar, 2.92 moles of $NO_2$ and 0.10 mole of $H_2O$. The gas is directed via line 21 to the bottom of Oxidizer 1. The stripped sulfuric acid exiting from the bottom of Stripper 3 contains 25.63 moles of $H_2SO_4$ and 60.23 moles of $H_2O$.

The stripped sulfuric acid from Stripper 3 is sent via line 14 to sulfuric acid concentrator 4, where it is heated at the boil under atmospheric pressure to remove 49.74 moles per hour of $H_2O$. The concentrated sulfuric acid product of 4 contains, per hour, 25.63 moles of $H_2SO_4$ and 10.49 moles of $H_2O$.

This concentrated acid from concentrator 4 is sent via pump 5 and line 15 to the top of the Finishing Tower 10. In 10, the downflowing acid contacts the upflowing gas product from HCL Oxidizer 2, removing water and small amounts of nitrogen species from the gas. The product gas issuing from the top of 10 contains, per hour, 49.74 moles of $CL_2$ and 0.52 mole of HCL, or over 99 percent pure $CL_2$. The sulfuric acid from the bottom of 10 is sent via pump 6 and line 17 to the top of HCL Oxidizer 2, being combined at the entrance to 2 with sulfuric acid-nitric acid mixture from heat exchanger 7 and Oxidizer 1 via line 18. The sulfuric acid from 10 contains, per hour, 24.36 moles of $H_2SO_4$, 0.25 mole of $HNO_3$, 1.27 moles of $H(NO)SO_4$ and 10.94 moles of $H_2O$. The acid mixture from the bottom of Oxidizer 1 contains, per hour, 431.23 moles of $H_2SO_4$, 2.63 moles of $H(NO)SO_4$, 49.74 moles of $HNO_3$ and 997.97 moles of $H_2O$. The two streams, from 10 and 1 (via Heat exchanger 7), combine and then enter Oxidizer 2.

Referring now to the top of Stripper 3, the gas from 3 enters Oxidizer 1 via line 21 and flows upward, contacting the downflowing acid mixture which contains, per hour, 384.41 moles of $H_2SO_4$, 49.45 moles of $H(NO)SO_4$ and 1046.15 moles of $H_2O$. The gas exiting from the top of 1 through Heat Exchanger 13 contains small amounts of nitrogen species which are condensed in 13 at −25°C. and 5 to 15atm. pressure and returned to the acid in 1. The gas issuing from 13 contains 1.24 moles per hour of $O_2$ and 0.13 moles per hour of Ar. In oxidizer 1, nitrosyl sulfuric acid is oxidized to nitric acid with oxygen. Temperature is about 90°C. at the top of 1 and about 120°C. at the bottom.

While the process has been illustrated with a purification step in which the nitrogen species impurities, amounting to about 3 percent by weight, are removed from the chlorine gas product of Oxidizer 2, this purification is not essential. Where chlorine of lower purity can be used, the purification can be omitted.

The embodiments of the invention in which an exclusive property or privilege is claimed are defined as follows:

1. In a continuous process for making chlorine comprising
   i. reacting hydrogen chloride with an aqueous oxidizing mixture of nitric and sulfuric acids thereby producing a chlorine-containing species, a nitrogen-containing species, spent sulfuric acid and water, and
   ii. reacting the nitrogen-containing species with oxygen and aqueous sulfuric acid reactants thereby regenerating an aqueous mixture of nitric and sulfuric acids, the improvement comprising,
   maintaining in (i) a critical water concentration from 23.0 to 27.5 percent, by weight of the oxidizing mixture, maintaining the mol ratio of hydrogen chloride to nitric acid at between 1.8–2.2 to 1, and concentrating up to about 10 percent of the spent sulfuric acid and returning this concentrated acid back to the reaction, thereby maintaining the critical water concentration therein; and
   maintaining in (ii) a critical water ratio from 27.5 to 30.0 percent, by weight of the reactants, thereby producing chlorine of at least 95 percent purity in a yield of at least 95 percent based on HCL and converting in excess of about 90 percent of said nitrogen containing species to nitric acid.

* * * * *